(12) United States Patent
Churchville et al.

(10) Patent No.: US 11,681,670 B1
(45) Date of Patent: Jun. 20, 2023

(54) SYSTEMS AND METHODS FOR DATA VERIFICATION

(71) Applicant: Wells Fargo Bank, N.A., San Francisco, CA (US)

(72) Inventors: Ernest Joseph Churchville, King of Prussia, PA (US); Michael Andrew Stone, Charlotte, NC (US); Yonathan Lakew, Waxhaw, NC (US); Dawn M. Martin, Urbandale, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/451,805

(22) Filed: Oct. 21, 2021

(51) Int. Cl.
*G06F 16/00* (2019.01)
*G06F 16/215* (2019.01)
*G06Q 10/0637* (2023.01)
*G06F 16/28* (2019.01)
*G06F 16/23* (2019.01)

(52) U.S. Cl.
CPC ........ *G06F 16/215* (2019.01); *G06F 16/2358* (2019.01); *G06F 16/285* (2019.01); *G06Q 10/06375* (2013.01)

(58) Field of Classification Search
CPC ............... G06F 16/2477; G06F 16/951; G06F 11/3072; G06F 11/3438; G06F 17/18; G06F 21/552; G06F 21/577; G06F 21/602; G06F 21/6245; G06F 21/6254; G06F 21/84; G06F 2201/86; G06F 2221/031; G06F 2221/032; G06F 2221/034; G06F 16/9024; G06F 18/21; G06F 18/2113; G06F 18/23213; G06F 18/241; G06F 18/251; G06F 21/53; G06F 21/554; G06F 21/566; G06N 20/00; G06N 5/022; G06N 5/025
See application file for complete search history.

(56) References Cited

U.S. PATENT DOCUMENTS

| 10,628,058 | B1 | 4/2020 | Riley et al. | |
| 11,178,168 | B1* | 11/2021 | Lin | H04L 63/1433 |
| 2011/0105852 | A1* | 5/2011 | Morris | G06Q 10/10 |
| | | | | 600/300 |

(Continued)

OTHER PUBLICATIONS

P. Kung, Business process monitoring & measurement in a large bank: challenges and selected approaches, IEEE Conference Publication, IEEE Xplore, May 2021.

(Continued)

*Primary Examiner* — Shyue Jiunn Hwa
(74) *Attorney, Agent, or Firm* — Womble Bond Dickinson (US) LLP

(57) ABSTRACT

Systems, apparatuses, methods, and computer program products are disclosed for verifying record data. An example method includes creating the plurality of datasets ranked by the dataset risk level, receiving a dataset from a plurality of datasets ranked by a dataset risk level, where the dataset includes one or more records and each record including data elements. The example method further includes applying a set of rules to the data elements of the one or more records to identify anomalous data elements, and displaying an association between each anomalous data element and each corresponding rule violation, where each anomalous data element is associated with a data element risk.

20 Claims, 5 Drawing Sheets

(56) References Cited

U.S. PATENT DOCUMENTS

2014/0279422 A1    9/2014   Holman et al.
2019/0036970 A1*   1/2019   Shih .................... G06F 21/6245

OTHER PUBLICATIONS

Tshadi Aljawarneh, Usage of date validation techniques in online banking: A perspective and case study, 2012 Macmillan Publishers Ltd. 0955-1662 Security Journal 1-9, www.palgrave-journals.com/sj/, Feb. 2014.

* cited by examiner

SYSTEMS AND METHODS FOR DATA VERIFICATION

BACKGROUND

Organizations, such as financial institutions, routinely receive and generate large volumes of data that is reported to downstream systems for subsequent use (e.g., to detect fraud). Often this data is customer data that is shared with other organizations to assist in making customer transaction decisions. If errant data is reported, it can affect the downstream systems. Certain types of data carry higher downstream risk internally to the organization and externally to other organizations than other types of data.

BRIEF SUMMARY

Organizations, such as banks or other companies that process data, routinely share data with data processing services. For instance, many banks share data with Early Warning Services (EWS) for various purposes, such as to provide fraud protection services. Data processing services such as EWS typically host and manage a database of the information for use by a multitude of organizations to make decisions on how and whether to interact with the various individuals or entities. Data processing services accordingly will make the data available to other organizations to use in making decisions, such as whether to authorize transactions requested by various customers. As such, the data processing service may be a third-party organization that sits between the reporting organization and downstream systems that use the reported information to make significant business decisions. Anomalous data (e.g., errant or inaccurate data or, more broadly, data having values that exceed defined thresholds of expected values) may have a negative impact on the process flow of the data processing service, on the data processing service, other partnering organizations, and various customers. The data may include transaction information, account information, customer information, etc., where each data may have a different risk level to each organization. For example, data provided by a customer may include a low risk anomaly, such as a typographical error (e.g., Callifornia) or a higher risk anomaly (e.g., fraudulent income data). Organizations reporting data to the data processing service may have to comply with established rules and standards in the industry, and legal requirements with respect to obligations to provide complete and accurate data through its validation processes.

However, failure to provide information in a timely fashion can itself cause problems, because recent information is often the most relevant. This is particularly true with regard to the financial services industry, where recent transactions often are the most useful for identifying fraud and other risks. At the same time, the volume of transactions handled by organizations in the financial services industry is often so large as to prevent exhaustive error-detection processes quickly enough to permit transmission of recent transactions quickly enough so that they can be used most effectively. Accordingly, to permit use of recent information, in many situations, organizations in the financial services industry may provide information to data processing services in real-time or near-real-time, but then later will scan, flag and/or report anomalies back to the data processing service to enable further research to identify whether those anomalies represent defects or valid data that is merely outside of expected range. This approach, of course, leads to the possibility of erroneous data entering into the databases used by data processing services such as EWS, and in turn may cause downstream issues to users of such data.

The conventional process for error correction (e.g., from detection to reporting, to risk mitigation) is based on a slow, manual, and thus inefficient workflow. This problem is compounded by the daily volume of data that prohibits exhaustive manual data inspection and validation. Further, the conventional data validation process does not contribute to the prevention of data anomalies in the same type of transactions or similar future transactions. Because of the volume of data, the manual filtering process, and the fact that a transaction associated with the data cannot be postponed, there often remains a risk that a high risk data anomaly is not caught, or is corrected too late in the process to stop or mitigate downstream impacts. For example, only discovering a data anomaly three months after transmission of the anomalous data to a data processing system may result in many actions (e.g., credit determinations, loan approvals, etc.) being taken based on the anomalous (and potentially fraudulent) data.

Systems, apparatuses, methods, and computer program products are disclosed herein for verifying data and preventing and/or reducing risk earlier in the workflow than has historically occurred. As detailed above, not all data carries the same risk. Example embodiments described herein provide for division of data into datasets ranked by their respective risk levels. The risk levels may be determined by the risk associated with the underlying data elements of the records included in the dataset. The riskiest datasets can be addressed first and a set of rules may be applied to determine and identify the anomalous data within the riskiest datasets. The identified anomalous data elements may be grouped according to its corresponding rule violation and associated risk for additional analysis.

In one example embodiment, a method is provided for verifying record data. The method includes creating, by a ranking engine, a plurality of datasets ranked by a dataset risk level, and receiving, by communications circuitry, a dataset from the plurality of datasets, wherein the dataset comprises one or more records, each record comprising data elements. The method further includes applying, by evaluation circuitry, a set of rules to the data elements of the one or more records to identify anomalous data elements, and generating, by the evaluation circuitry, an association between each anomalous data element and each corresponding rule violation, wherein each anomalous data element is associated with a data element risk.

In another example embodiment, an apparatus is provided for verifying record data. The apparatus includes a ranking engine configured to create a plurality of datasets ranked by a dataset risk level, and communications circuitry configured to receive a dataset from the plurality of datasets ranked by a dataset risk level, wherein the dataset comprises one or more records, each record comprising data elements. The apparatus further includes evaluation circuitry configured to apply a set of rules to the data elements of the one or more records to identify anomalous data elements, and input-output circuitry configured to display an association between each anomalous data element and each corresponding rule violation, wherein each anomalous data element is associated with a data element risk.

In yet another example embodiment, a computer program product is provided for verifying record data. The computer program product includes at least one non-transitory computer-readable storage medium storing software instructions that, when executed, cause an apparatus to create a plurality of datasets ranked by a dataset risk level, receive a dataset from the plurality of datasets ranked by a dataset risk level, wherein the dataset comprises one or more records, each record comprising data elements, apply a set of rules to the data elements of the one or more records to identify anomalous data elements, and display an association between each anomalous data element and each corresponding rule violation, wherein each anomalous data element is associated with a data element risk.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
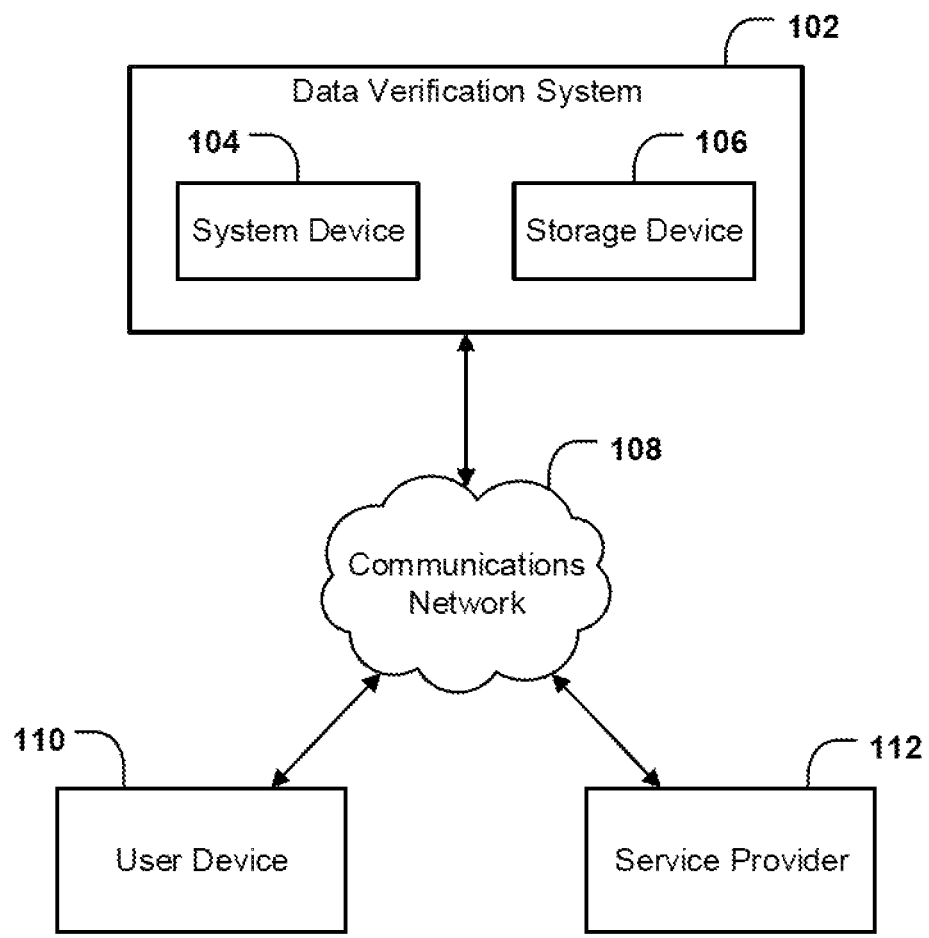
FIG. 1 illustrates a system in which some example embodiments may be used for data verification and risk reduction.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for verifying data and reducing risk. In particular, example embodiments rely upon grouping records containing data elements into datasets according to risk levels associated with the underlying data elements. The risk levels may be determined by the risk associated with the underlying data elements. It will be understood that different types of risks may be presented by different data elements. For instance, anomalous data may present operational risk, compliance risk, credit risk, liquidity risk, or other types of risk, any of which may have adverse impacts upon an organization. Regardless of the type of risk that may be presented, the significance of these various risks may be used to rank the overall risk presented by the data elements. To do this, a set of rules may be applied to the highest risk level datasets first to identify anomalous data within each record of each dataset. The identified anomalous data elements of each record may be grouped according to their corresponding rule violations and associated data element risks. Once grouped, the data may be displayed to a user or undergo additional analysis to determine characteristics of the anomalous data (e.g., source of the data) for traceability and corrective action. In some embodiments, an anomaly rate may be determined from the anomalous data elements, and those elements may be grouped based on risk, such as the dataset risk level and the data element risk. Additionally, a recommendation may be made for corrective action for one or more instances of anomalous data or to prevent future activity that creates anomalies of the type identified.

In contrast to conventional techniques for data verification, example embodiments described herein provide an automated process that is scalable to efficiently address the voluminous amounts of transaction and customer data that large organizations typically utilize. In doing so, example embodiments minimize and/or avoid the need for manual effort to filter and verify data according to risk level. As detailed above, not all data carries the same risk, so to manually process all data to assess risk and recommend corrective actions itself poses risks of introducing human error, creating bottlenecks and/or inefficiency or inconsistency, and allowing for potential financial loss for organizations that rely on the accuracy of the data. Therefore, automatically processing the data as described in example embodiments herein saves time and resources, reduces risk of providing anomalous data to internal and externally sources, and greatly reduces or eliminates corrective response times and human error that has been unavoidable in the past.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, a data verification system 102 may include a system device 104 in communication with a storage device 106. Although system device 104 and storage device 106 are described in singular form, some embodiments may utilize more than one system device 104 and/or more than one storage device 106. Additionally, some embodiments of the data verification system 102 may not require a storage device 106 at all. Whatever the implementation, the data verification system 102, and its constituent system device(s) 104 and/or storage device (s) 106 may receive and/or transmit information via communications network 108 (e.g., the Internet) with any number of other devices, such as user device 110 and service provider 112.

System device 104 may be implemented as one or more servers, which may or may not be physically proximate to other components of data verification system 102. Furthermore, some components of system device 104 may be physically proximate to the other components of data verification system 102 while other components are not. System device 104 may receive, process, generate, display, and transmit data, signals, and electronic information to facilitate the operations of the data verification system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the data verification system 102. Storage device 106 may store information relied upon during operation of the data verification system 102, such as various datasets, records, and data elements that may be used, analyzed, shared and displayed by the data verification system 102. Similarly, the storage device 106 may store one or more sets of rules that may be applied to analyze datasets, records, and data elements. Storage device 106 may further store software packages that may be executed by the data verification system 102 to analyze, group, share, and display the datasets, records, and data elements, and to provide recommendations to correct and mitigate future risk based thereon. In addition, storage device 106 may store control signals, device characteristics, and access credentials enabling interaction between the data verification system 102, the user device 110, and the service provider 112.

The service provider 112 and user device 110 may be embodied by any computing devices known in the art, such as desktop or laptop computers, tablet devices, smartphones, or the like. The service provider 112 need not itself be an independent device but may be distributed peripheral devices communicatively coupled to other computing devices. The service provider 112 may be used to interact with the data verification system 102 to receive consumer or customer reporting data associated with the data verification activities of the data verification system 102, as described herein.

The user device 110 may be used to interact with the data verification system 102 to provide datasets, records, and data elements that may be used by the data verification system 102 as described herein. Additionally, the user device 110 may be utilized to input commands to the data verification system 102 and display results, recommendations, or any other data generated by the data verification system 102, or may provide data and verification results to the service provider 112.

Example Implementing Apparatuses

Figure 2:
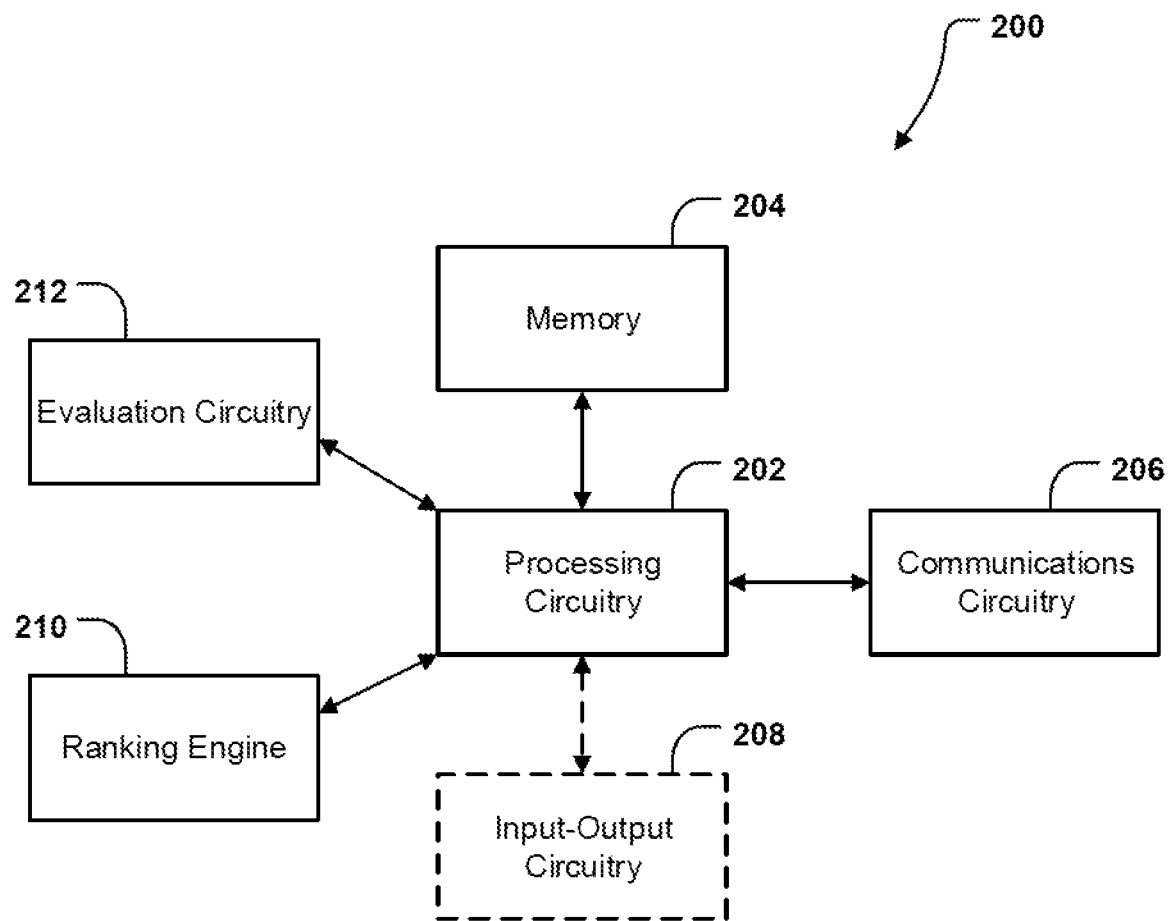
FIG. 2 illustrates a schematic block diagram of example circuitry embodying a device that may perform various operations in accordance with some example embodiments described herein.

System device 104 of the data verification system 102 (described previously with reference to FIG. 1) may be embodied by one or more computing devices or servers, shown as apparatus 200 in FIG. 2. As illustrated in FIG. 2, the apparatus 200 may include processing circuitry 202, memory 204, communications circuitry 206, input-output circuitry 208, evaluation circuitry and evaluation circuitry 212, each of which will be described in greater detail below. While the various components are only illustrated in FIG. 2 as being connected with processing circuitry 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 3-5.

The processing circuitry 202 (e.g., a processor and/or co-processor or any other processor assisting or otherwise associated with the processor) may be in communication with the memory 204 via a bus for passing information amongst components of the apparatus. The processing circuitry 202 may be embodied in a number of different ways and may, for example, include one or more processing devices configured to perform independently. Furthermore, the processing circuitry 202 may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processing circuitry 202 may be configured to execute software instructions stored in the memory 204 or otherwise accessible to the processing circuitry 202 (e.g., software instructions stored on a separate storage device 106, as illustrated in FIG. 1). In some cases, the processing circuitry 202 may be configured to execute hard-coded functionality. As such, whether configured by hardware or software methods, or by a combination of hardware with software, the processing circuitry 202 represent an entity (e.g., physically embodied in circuitry) capable of performing operations according to various embodiments of the present invention while configured accordingly. Alternatively, as another example, when the processing circuitry 202 is embodied as an executor of software instructions, the software instructions may specifically configure the processing circuitry 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as a service provider 112 (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processing circuitry 202 to control one or more functions of one or more of these user interface elements through software instructions (e.g., application software and/or system software, such as firmware) stored on a memory (e.g., memory 204) accessible to the processing circuitry 202.

In addition, the apparatus 200 further comprises a ranking engine 210 configured to rank a multitude of datasets by a dataset risk level. Each dataset may include a multitude of records that further include data elements. The ranking engine 210 may receive records including data elements from memory 204 or using communications circuitry 206 or input-output circuitry 208. Each data element of a corresponding record may be compared, by the ranking engine 210, to a plurality of data qualifiers associated with a data element risk. The ranking engine 210 may group each record of the same dataset risk level into the one or more datasets. As described in connection with FIGS. 3 to 5 below, the ranking engine 210 may utilize processing circuitry 202, memory 204, or any other hardware component included in the apparatus 200 to perform these operations and store various results. The ranking engine 210 may further utilize communications circuitry 206 to gather data from a variety of sources (e.g., user device 110, service provider 112, or storage device 106, as shown in FIG. 1), may utilize input-output circuitry 208 to receive data from a user or other source, and in some embodiments may utilize processing circuitry 202 and/or memory 204 to rank datasets by dataset risk level.

In addition, the apparatus 200 further comprises an evaluation circuitry 212 configured to apply a set of rules to the data elements of the one or more records to identify anomalous data elements. In one embodiment, the evaluation circuitry evaluates the highest risk datasets as described with respect to the ranking engine 210 above. The evaluation circuitry 212 may further be configured to apply the set of rules to determine whether any of the data elements of the one or more records have anomalies. For example, but not limited to, missing data, not conforming to allowed values, or align to relational requirements of required elements across a record, among others. In addition to evaluating data elements, the evaluation circuitry 212 may determine whether any records of the multitude of records are duplicate records and take an action, such as omit them from analysis, delete them, or flag them. An association between each anomalous data element and each corresponding rule violation may be generated for display to a user of the system (e.g., data verification system 102) or a user device (e.g., user device 110), where each anomalous data element is associated with a data element risk.

The evaluation circuitry 212 may further be configured to determine an anomaly rate of anomalous data elements and group those elements based on risk, such as the dataset risk level and the data element risk. The data element risk may be tiered values representing high, medium and low risks (e.g., fraudulent data and typographical error), and the threshold values may be associated with one or both of an anomaly rate over time or over a quantity (e.g., over 30 days or per 1000 datasets). In one embodiment, the threshold value determines guidelines for the RCA to be resolved. For example, if the anomaly rate exceeds the anomaly rate threshold value, the guidelines may indicate that the RCA should be resolved within 30 days, but when the anomaly rate is below the anomaly rate threshold value, the guidelines may indicate that the RCE should be resolved within 60 days.

The evaluation circuitry 212 may utilize processing circuitry 202, memory 204, or any other hardware component included in the apparatus 200 to perform these operations, as described in connection with FIGS. 3 to 5 below. The evaluation circuitry 212 may further utilize communications circuitry 206 to gather records, data elements, and thresholds, from a variety of sources (e.g., user device 110, service provider 112, or storage device 106, as shown in FIG. 1), may utilize input-output circuitry 208 to receive data from a user, and in some embodiments may utilize processing circuitry 202 and/or memory 204 to evaluate datasets by applying a set of rules to the data elements of the one or more records to identify anomalous data elements.

The evaluation circuitry 212 may be configured to determine a source of each anomalous data element from attributes associated with each anomalous data element, such as data maps and metadata associated with the business pertaining to the data elements. In one embodiment, a recommendation may be generated by the evaluation circuitry 212 to correct the cause each anomalous data element based on its source and a comparison to similar past anomalous data elements.

Communications circuitry 206, according to an embodiment, may be used to communicate corrected anomalous data as processed by the evaluation circuitry 212 to various sources. For example, the data verification system 102 may communicate corrected consumer or customer reporting data to the service provider 112 through communications circuitry 206.

Although components 202-212 are described in part using functional language, it will be understood that the particular implementations necessarily include the use of particular hardware. It should also be understood that certain of these components 202-212 may include similar or common hardware. For example, the ranking engine 210 and evaluation circuitry 212 may each at times leverage use of the processing circuitry 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the ranking engine 210 and evaluation circuitry 212 may leverage processing circuitry 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processing circuitry 202 executing software stored in a memory (e.g., memory 204), or memory 204, communications circuitry 206 or input-output circuitry 208 for enabling any functions not performed by special-purpose hardware elements. In all embodiments, however, it will be understood that the ranking engine 210 and evaluation circuitry 212 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Figure 3:
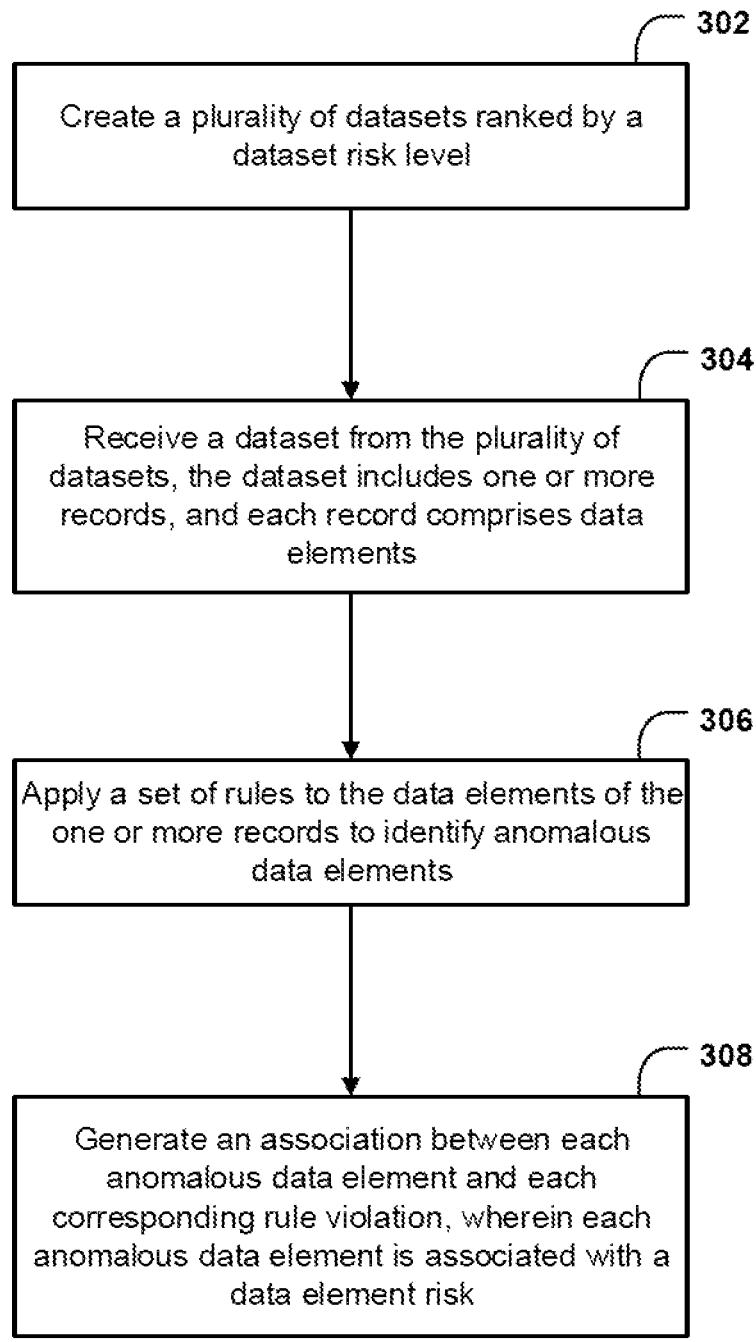
FIG. 3 illustrates an example flowchart for verifying record data, in accordance with some example embodiments described herein.
Figure 4:
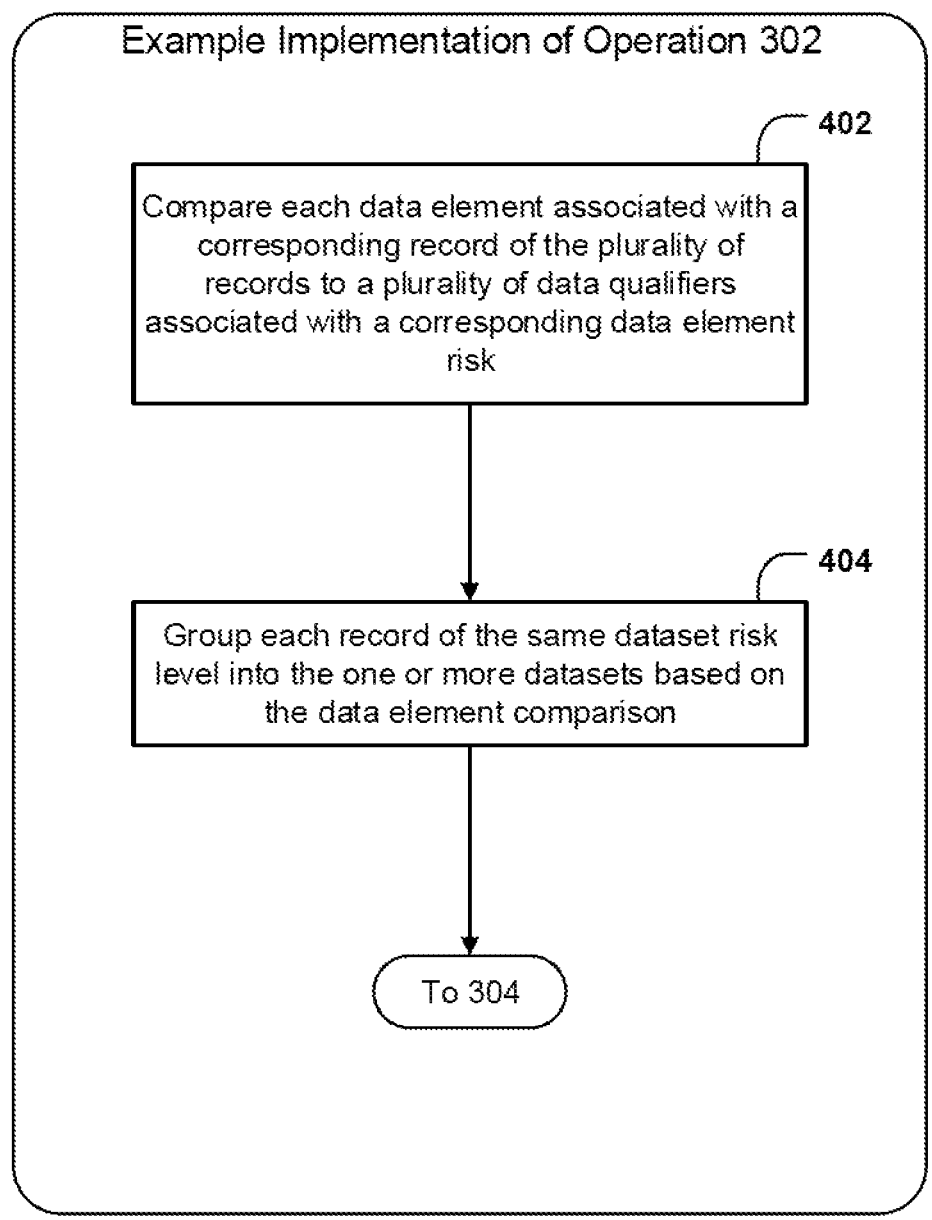
FIG. 4 illustrates an example flowchart for example operations detailing the creating of a multitude of datasets ranked by a dataset risk level, in accordance with some example embodiments described herein.
Figure 5:
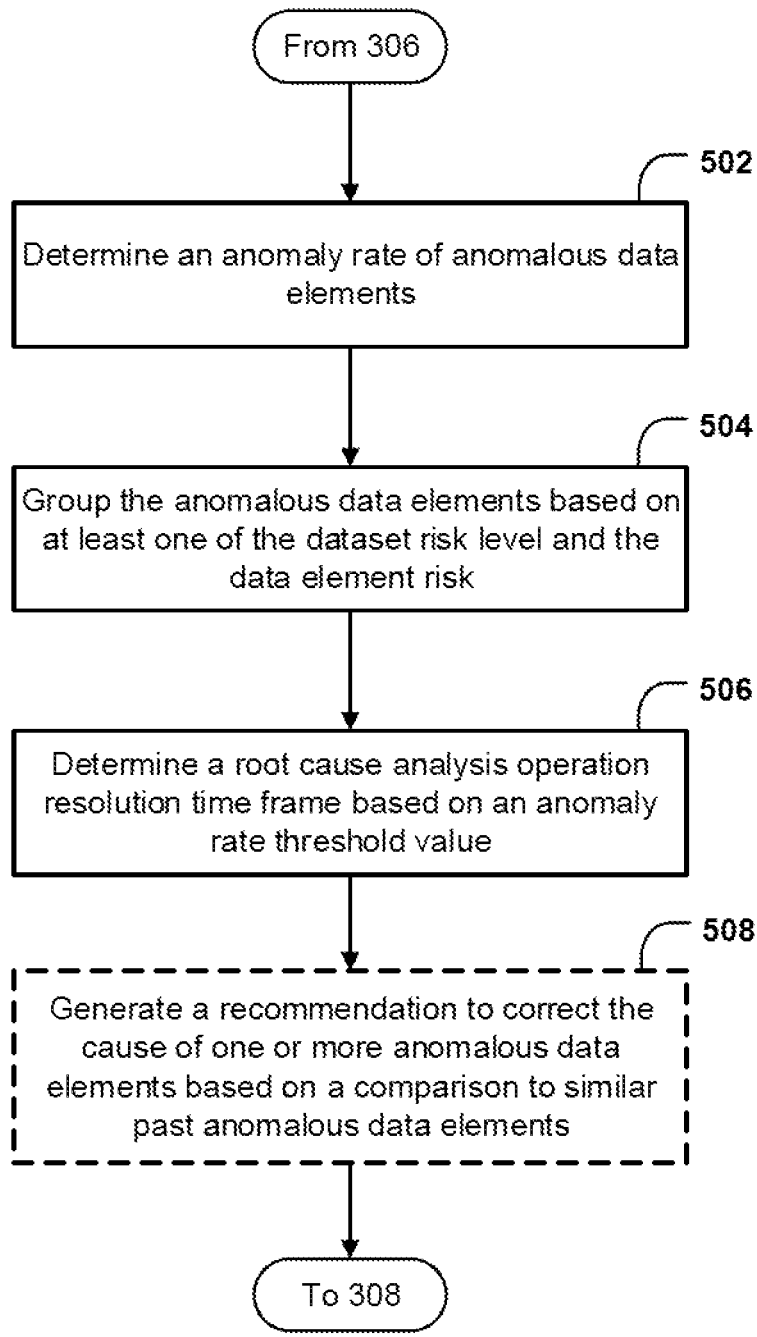
FIG. 5 illustrates another example flowchart for analyzing the results of applying the set of rules to the data elements of the one or more records to identify anomalous data elements, in accordance with some example embodiments described herein.

Turning to FIGS. 3 to 5, example flowcharts are illustrated that contain operations implemented by example embodiments described herein. The operations illustrated in FIGS. 3 to 5 may, for example, be performed by system device 104 of the data verification system 102 shown in FIG. 1, which may in turn be embodied by an apparatus 200, which is shown and described in connection with FIG. 2. To perform the operations described below, the apparatus 200 may utilize one or more of processing circuitry 202, memory 204, communications circuitry 206, input-output circuitry 208, ranking engine 210, evaluation circuitry 212, and/or any combination thereof. It will be understood that user interaction with the data verification system 102 may occur directly via input-output circuitry 208, or may include interactions with the service provider 112 through the communications network 108, as shown in FIG. 1.

Turning first to FIG. 3, example operations are shown for verifying record data. As shown by operation 302, the apparatus 200 includes means, such as processing circuitry 202, memory 204, ranking engine 210, or the like, for creating a multitude of datasets ranked by a dataset risk level, as described in detail above with respect to FIG. 2. Communications circuitry 206 may be used to gather and store data (e.g., datasets) from a variety of sources (e.g., user device 110 or service provider 112 of FIG. 1). In another embodiment, input-output circuitry 208 may also be utilized to receive and transmit data (e.g., datasets) from a user or storage device (e.g., or storage device 106 of FIG. 1) or other source. The underlying mechanism for implementing operation 302, according to one embodiment, will be described in greater detail below in connection with FIG. 4.

As shown by operation 304, the apparatus 200 includes means, such as processing circuitry 202, memory 204, communications circuitry 206, input-output circuitry 208, evaluation circuitry 212, or the like, for receiving a dataset from the multitude of datasets. By ranking the various datasets by dataset risk level, those datasets carrying the highest risk can be prioritized. For instance, the riskiest datasets can be addressed first and a set of rules may be applied to determine and identify the anomalous data within these riskiest datasets. Each dataset includes one or more records, and each record includes data elements. The data may be received through communications circuitry 206 from a data source containing the datasets generated in operation 302 (e.g., user device 110 of FIG. 1), or input-output circuitry 208 connected to a storage device (e.g., or storage device 106 of FIG. 1), or other source configured to store created datasets.

As shown by operation 306, the apparatus 200 includes means, such as processing circuitry 202, memory 204, communications circuitry 206, input-output circuitry 208, evaluation circuitry 212, or the like, for applying a set of rules to the data elements of the one or more records to identify anomalous data elements. The underlying mechanism for implementing operation 306, according to one embodiment, will be described in greater detail below in connection with FIG. 5.

Finally, as shown by operation 308, the apparatus 200 includes means, such as processing circuitry 202, memory 204, communications circuitry 206, input-output circuitry 208, evaluation circuitry 212, or the like, for generating an association between each anomalous data element and each corresponding rule violation, where each anomalous data element is associated with a data element risk. In one embodiment, the input-output circuitry 208 may be used to communicate the results of the generated association between each anomalous data element and each corresponding rule violation to a display of the data verification system 102. In another embodiment, the communications circuitry 206 may be used to communicate the results to a user, such as to user device 110.

Turning next to FIG. 4, example operations are shown to provide additional detail for operation 302 of FIG. 3 for creating a multitude of datasets ranked by a dataset risk level. As shown by operation 402, the apparatus 200 includes means, such as processing circuitry 202, memory 204, communications circuitry 206, input-output circuitry 208, ranking engine 210, or the like for comparing each data element associated with a corresponding record of the multitude of records to a multitude of data qualifiers, each associated with a corresponding data element risk. As previously mentioned, each dataset may include a multitude of records that further include data elements. The ranking engine 210 may be configured to receive records including data elements from memory 204 or using one or both of communications circuitry 206 or input-output circuitry 208. In one embodiment, each data element of a corresponding record may be compared, by the ranking engine 210, to a plurality of data qualifiers associated with an ascribed data element risk. In embodiments, data qualifiers associated with a corresponding data element risk may include attributes such as identity matching attributes, ownership attributes, status code attributes, dispute attributes, date and time attributes, and monetary attributes. By performing the comparison, the apparatus 200 identifies a risk level for each data element. In some embodiments, the ranking engine 210 may thereafter utilize processing circuitry 202 and/or memory 204 to rank records by dataset risk level based on the risk level identified for the constituent data elements in the records.

Thereafter, as shown by operation 404, the apparatus 200 includes means, such as processing circuitry 202, memory 204, communications circuitry 206, input-output circuitry 208, evaluation circuitry 212, or the like, for grouping each record of the same dataset risk level into the one or more datasets. A dataset risk level may be associated with one or more dataset qualifiers that may be defined by third party data processors (e.g., a service provider 112) established rules and standards in the industry, legal requirements, or by internally developed risk factors. For example, negative data reporting, consumer identification matching data, account ownership data, dispute information data, historical dataset issues, dataset accuracy review data, or data rejection reports may be factors ascribed a corresponding specific risk level. Negative data may include customer side data such as delinquencies, late payments, insolvency, or any type of default, and the like. In some embodiments the ranking engine 210 may utilize processing circuitry 202 and/or memory 204 to rank datasets by dataset risk level.

Turning next to FIG. 5, example operations are shown for analyzing the results of applying the set of rules to the data elements of the one or more records to identify anomalous data elements as discussed in the operations of FIG. 3. As shown by operation 502, the apparatus 200 includes means, such as processing circuitry 202, memory 204, communications circuitry 206, input-output circuitry 208, evaluation circuitry 212, or the like for determining an anomaly rate of anomalous data elements. In some embodiments, the rate is one of or combination of the number of occurrences over a time frame and/or a percentage of all anomalous data elements over a time frame.

As shown by operation 504, as shown by operation 502, the apparatus 200 includes means, such as processing circuitry 202, memory 204, communications circuitry 206, input-output circuitry 208, evaluation circuitry 212, or the like for grouping the anomalous data elements based on at least one of the dataset risk level and the data element risk. In one embodiment, the data element risk may be tiered values representing high, medium and low risks (e.g., fraudulent data and typographical error).

As shown by operation 506, as shown by operation 402, the apparatus 200 includes means, such as processing circuitry 202, memory 204, communications circuitry 206, input-output circuitry 208, evaluation circuitry 212, or the like for determining a root-cause analysis operation resolution time frame guideline based on an anomaly rate threshold value. In one embodiment, the anomaly rate threshold values may be associated with the anomaly rate, such as one or both of number of anomaly occurrences over a time frame and/or a percentage of all anomalous data elements over a time frame (e.g., over 30 days or per 1000 datasets).

Finally, as shown by the optional operation 508, the apparatus 200 includes means, such as processing circuitry 202, memory 204, communications circuitry 206, input-output circuitry 208, evaluation circuitry 212, or the like for generating a recommendation to correct the cause of one or more anomalous data elements based on a comparison to similar past anomalous data elements. This recommendation may be based on the resolution time frame guideline. In one embodiment, the threshold value determines a timeline for a root-cause analysis (RCA) to be resolved. For example, if the anomaly rate exceeds the anomaly rate threshold value, the RCA is triggered, and a recommendation is generated indicating that the RCA should be resolved within, for instance, 30 days. As another example, when the anomaly rate is below the anomaly rate threshold value, the generated recommendation may indicate that the RCE should be resolved within, for instance, 60 days.

As described above, example embodiments provide methods and apparatuses that enable improved verification of record data and reduce risk. Example embodiments thus provide tools that overcome the problems faced by manually performing the grouping and evaluation of large volumes of record data based on risk. Thus, example embodiments save time and resources, while reducing risk of providing anomalous data internally and externally, and greatly reducing or eliminating the possibility of human error and corrective response times that has been unavoidable in the past. Finally, by automating functionality that has historically required human filtering and analysis of data, the speed and consistency of the evaluations performed by example embodiments reduces risk and unlocks many potential new functions that have historically not been available, such as the ability to process data based on risk level, identify specific anomalous data, and provide recommendations to correct the data downstream and the cause of the anomalous data entry upstream.

As these examples all illustrate, example embodiments contemplated herein provide technical solutions that solve real-world problems faced during data verification and risk reduction. And while data verification and risk reduction has been an issue for decades, particularly in the financial industry, the recently exploding amount of data made available by emerging technology today has made this problem significantly more acute, as the demand for data verification and risk reduction has grown significantly even while the complexity of data verification and risk reduction has itself increased. At the same time, the recently arising ubiquity of data verification and risk reduction has unlocked new avenues to solving this problem that historically were not available, and example embodiments described herein thus represent a technical solution to these real-world problems.

FIGS. 3, 4, and 5 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for verifying record data, the method comprising:
    creating, by a ranking engine, a plurality of datasets ranked by a dataset risk level;
    receiving, by communications circuitry, a dataset from the plurality of datasets, wherein the dataset comprises one or more records, each record comprising data elements;
    applying, by evaluation circuitry, a set of rules to the data elements of the one or more records to identify anomalous data elements;
    generating, by the evaluation circuitry, an association between each anomalous data element and each corresponding rule violation, wherein each anomalous data element is associated with a data element risk;
    determining, by the evaluation circuitry, an anomaly rate of the anomalous data elements; and
    determining, by the evaluation circuitry, a root-cause analysis operation resolution time frame guideline based on the anomaly rate in relation to an anomaly rate threshold value.

2. The method of claim 1, wherein creating the plurality of datasets ranked by the dataset risk level comprises:
    comparing, by the ranking engine, each data element associated with a corresponding record of the one or more records to a plurality of data qualifiers associated with a corresponding data element risk in order to identify risk levels for the one or more records; and
    grouping, by the ranking engine and based on comparing each data element to the plurality of data qualifiers, each record of a particular dataset risk level into the plurality of datasets.

3. The method of claim 2, wherein the plurality of data qualifiers includes:
identity matching attributes, ownership attributes, status code attributes, dispute attributes, date and time attributes, or monetary attributes.

4. The method of claim 1, wherein applying the set of rules to the data elements of the one or more records to identify the anomalous data elements comprises:
    determining whether any of the data elements of the one or more records have missing data;
    determining whether any of the data elements of the one or more records do not conform to allowed values; and
    determining whether any of the data elements of a record align to relational requirements of required elements across the record.

5. The method of claim 1, wherein applying, by the evaluation circuitry, the set of rules to the data elements of the one or more records, comprises determining whether any records of the one or more records are duplicate records.

6. The method of claim 1, further comprising:
grouping the anomalous data elements based on at least one of the dataset risk level and the data element risk, wherein the root-cause analysis operation resolution time frame guideline specifies a time frame for addressing one or more of the anomalous data elements.

7. The method of claim 1, wherein determining the root-cause analysis operation resolution time frame guideline comprises:
determining, by the evaluation circuitry, a source of each anomalous data element from attributes associated with each anomalous data element.

8. The method of claim 7, further comprising:
generating a recommendation to correct a cause of one or more anomalous data elements based on a comparison to similar past anomalous data elements.

9. The method of claim 1, wherein each dataset risk level is associated with one of: negative data reporting, consumer identification matching data, account ownership data, dispute information data, historical dataset issues, dataset accuracy review data, or data rejection reports.

10. The method of claim 1, further comprising:
correcting one or more anomalous data elements; and
communicating, by the communications circuitry, the corrected one or more anomalous data elements to a service provider.

11. An apparatus for verifying record data, the apparatus comprising:
a ranking engine configured to create a plurality of datasets ranked by a dataset risk level;
communications circuitry configured to receive a dataset from the plurality of datasets that are ranked by dataset risk level, wherein the dataset comprises one or more records, each record comprising data elements;
evaluation circuitry configured to:
apply a set of rules to the data elements of the one or more records to identify anomalous data elements,
determine an anomaly rate of the anomalous data elements, and
determine a root-cause analysis operation resolution time frame guideline based on the anomaly rate in relation to an anomaly rate threshold; and
input-output circuitry configured to display an association between each anomalous data element and each corresponding rule violation, wherein each anomalous data element is associated with a data element risk.

12. The apparatus of claim 11, wherein the ranking engine configured to create the plurality of datasets ranked by the dataset risk level is further configured to:
compare each data element associated with a corresponding record of the one or more records to a plurality of data qualifiers associated with a corresponding data element risk; and
group, based on comparing each data element to the plurality of data qualifiers, each record of a particular dataset risk level into the plurality of datasets.

13. The apparatus of claim 12, wherein the plurality of data qualifiers includes: identity matching attributes, ownership attributes, status code attributes, dispute attributes, date and time attributes, and monetary attributes.

14. The apparatus of claim 11, wherein the evaluation circuitry configured to apply the set of rules to the data elements of the one or more records to identify the anomalous data elements is further configured to:
determine which of the data elements of the one or more records have missing data;
determine which of the data elements of the one or more records do not conform to allowed values; and
determine which of the data elements of a record align to relational requirements of required elements across the record.

15. The apparatus of claim 11, wherein the evaluation circuitry configured to apply the set of rules to the data elements of the one or more records, is further configured to determine which records of the one or more records are duplicate records.

16. The apparatus of claim 11, further comprising processing circuitry configured to:
trigger a root-cause analysis when the anomaly rate exceeds the anomaly rate threshold.

17. The apparatus of claim 11, further comprising processing circuitry is configured to:
determine a source of the anomalous data elements from attributes associated with the anomalous data elements.

18. The apparatus of claim 11, wherein each dataset risk level is associated with one of: negative data reporting, consumer identification matching data, account ownership data, dispute information data, historical dataset issues, dataset accuracy review data, or data rejection reports.

19. The apparatus of claim 11, wherein the communications circuitry is further configured to: communicate corrected anomalous data elements to a service provider.

20. A computer program product for verifying record data, the computer program product comprising at least one non-transitory computer-readable storage medium storing software instructions that, when executed, cause an apparatus to:
create a plurality of datasets ranked by a dataset risk level;
receive a dataset from the plurality of datasets ranked by a dataset risk level, wherein the dataset comprises one or more records, each record comprising data elements;
apply a set of rules to the data elements of the one or more records to identify anomalous data elements;
display an association between each anomalous data element and each corresponding rule violation, wherein each anomalous data element is associated with a data element risk;
determine an anomaly rate of the anomalous data elements; and
determine a root-cause analysis operation resolution time frame guideline based on the anomaly rate in relation to an anomaly rate threshold value.

* * * * *